UNITED STATES PATENT OFFICE.

ROBERT C. PALMER, OF PENSACOLA, FLORIDA, ASSIGNOR, BY MESNE ASSIGNMENTS, TO THE GOVERNMENT OF THE UNITED STATES AND THE PEOPLE THEREOF.

METHOD OF DESTRUCTIVELY DISTILLING WOOD.

1,271,071.  Specification of Letters Patent.  Patented July 2, 1918.

No Drawing.  Application filed March 23, 1917. Serial No. 157,058.

(DEDICATED TO THE PUBLIC.)

*To all whom it may concern:*

Be it known that I, ROBERT C. PALMER, a citizen of the United States of America, residing at Pensacola, in the county of Escambia, State of Florida, (whose post-office address is Pensacola, Florida,) have invented a new and useful Method of Destructively Distilling Wood.

The object of my invention is to provide a process, which is simple in operation, for effecting the recovery from wood tar the methoxy groups as methyl alcohol. It is well known that in carbonization of wood large amounts of tar are formed amounting to 7 or 8 per cent. of the dry weight of hardwoods and 15 to 20 per cent. of the weight of resinous woods. The chemical analyses of these tars show that, among other constitutents, they contain what are known as methyl phenol ethers which are combinations of complex phenols with methoxy groupings ($CH_3O$). These methoxy groups are also present in the original wood and are the source of the methyl alcohol recovered by destructive distillation. The amount of methyl alcohol recovered is, however, less than one-third of the total possible by the usual methods of distillation. The fact that many of these groups are united with the constituents of the tar explains, in part, the failure to recover the total possible amount of methyl alcohol by simple destructive distillation.

I have discovered that, if wood tars or mixtures of wood and wood tar are destructively distilled in the presence of various chemical catalyzers under pressure, or without pressure, a large proportion of the methoxy groups are split off chemically from the tar to form methyl alcohol.

In the practice of my invention either hardwood or resinous wood tar is placed in a suitable retort and the wood to be treated is likewise placed in such retort, or either hardwood or resinous wood tar is impregnated into the wood by any of the means used for injecting oils into wood for preserving it from decay, and the treated wood placed in a suitable retort and heated to the temperature of carbonization of wood or the distillation point of tar, with or without pressure in the retort, depending upon the mixture being distilled. The vapors are condensed as usual and the watery liquid obtained is separated from the oils distilled from the wood. The watery distillate is then refined for the recovery of methyl alcohol, acetic acid, or other valuable products by any suitable means. By the distillation of equal parts of wood and tar, for example, under a pressure not exceeding 30 pounds per square inch, twice as much alcohol can be recovered as from wood alone with a recovery of 75 per cent. of the tar. In the distillation of tar in the presence of chemical catalyzers only, especially phosphoric acid, a small amount of water is mixed with the tar to facilitate the recovery of alcohol from the oily distillate. This distillation is also preferably carried out under pressure in order that the effect of the catalyzer may be increased by prolonging the time with which it is in contact with the tar. When pressure is used, a pressure regulating device is placed between the retort and the condenser so that the pressure within the retort can be controlled without affecting the condensation. When the methoxy groups are completely split off from the phenol ethers, the acid phenols themselves may be formed and the tar recovered from the distillation is then refined by suitable means for the recovery of these constituents which are of more value than the phenol ethers from which they were formed.

Having thus described my invention, I claim:

1. The process of adding a suitable amount of water to wood tar, distilling the mixture under pressure whereby methyl alcohol is produced from the wood tar, condensing the vapors and recovering methyl alcohol, acetic acid, acid phenols and tar oils from the condensed vapors.

2. The process of adding to wood tar a suitable amount of water and of a chemical catalyzer such as phosphoric acid, distilling the mixture whereby methyl alcohol and acid phenols are formed from the wood tar constituents, condensing the vapors and recovering methyl alcohol, acetic acid, acid phenols, and tar oil from the condenser vapors.

3. The process of adding to wood tar pitch, a suitable amount of water and of a chemical catalyzer such as phosphoric acid, distilling the mixture whereby methyl alcohol and acid phenols are formed from the wood tar constituents, condensing the vapors and recovering methyl alcohol, acetic acid, acid phenols, and tar oil from the condensed vapors.

4. The process of adding to any of the fractions of crude wood tar a suitable amount of water and of a chemical catalyzer such as phosphoric acid, distilling the mixture whereby methyl alcohol and acid phenols are formed from the wood tar constituents, condensing the vapors and recovering methyl alcohol, acetic acid, acid phenols, and tar oil from the condensed vapors.

5. The process of distilling mixtures of wood with wood tar at a temperature necessary to carbonize the wood, confining the vapors in the retort under pressure, condensing the released vapors, and recovering methyl alcohol, acetic acid, acid phenols and tar oils from the condensed vapors.

6. The process of distilling mixtures of wood, wood tar and a chemical catalyzer such as phospheric acid at a temperature necessary to carbonize the wood, condensing the vapors, and recovering methyl alcohol, acetic acid, acid phenols, and tar oils from the condensed vapors.

In testimony whereof, I affix my signature in the presence of two subscribing witnesses.

ROBERT C. PALMER.

Witnesses:
 ALMA E. FISHER,
 INMAN F. ELDREDGE.